United States Patent [19]

Collins et al.

[11] Patent Number: 5,588,856

[45] Date of Patent: Dec. 31, 1996

[54] SEALING MEMBER AND METHODS OF SEALING

[75] Inventors: Mary A. Collins, Fremont; David G. Perkins, Union City; Harry E. White, Newark, all of Calif.

[73] Assignee: Raychem Corporation, Menlo Park, Calif.

[21] Appl. No.: 762,533

[22] Filed: Jan. 14, 1992

Related U.S. Application Data

[63] Continuation-in-part of Ser. No. 584,320, Sep. 18, 1991, abandoned.

[51] Int. Cl.[6] ........................................... H01R 4/60
[52] U.S. Cl. .................. 439/204; 439/589; 439/936
[58] Field of Search ........................... 439/204, 519, 439/199, 521, 271, 936, 278, 279, 426, 587, 589; 174/76, 77 R

[56] References Cited

U.S. PATENT DOCUMENTS

| | | | |
|---|---|---|---|
| 2,700,141 | 1/1955 | Jones | 439/426 |
| 3,138,657 | 6/1964 | Wengen | 174/76 |
| 4,186,986 | 2/1980 | Shoemaker | 439/204 |
| 4,332,975 | 6/1982 | Dienes | 174/76 |
| 4,718,678 | 1/1988 | Vansant | . |
| 4,852,646 | 8/1989 | Dittmer et al. | 165/185 |
| 4,875,870 | 10/1989 | Hardy et al. | 439/936 X |

FOREIGN PATENT DOCUMENTS

| | | | |
|---|---|---|---|
| 1035697 | 8/1983 | U.S.S.R. | 439/587 |
| WO90/05401 | 5/1990 | WIPO | . |

*Primary Examiner*—Khiem Nguyen
*Attorney, Agent, or Firm*—Herbert G. Burkard; Sheri M. Novack

[57] ABSTRACT

An open end of a hollow member is sealed using a sealing member comprising a layer of sealant between two constraining layers. Force is applied to the sealing member to maintain the sealant in sealing contact with the inner walls of the hollow member. At least one of the constraining layers and/or the means of applying force is sufficiently resilient to accommodate volume changes of the sealant during temperature fluctuations and displacement of the sealant when a substrate is inserted into the hollow member through the sealing member. To facilitate insertion of the substrate through the sealing member, holes and/or slits may be provided in one or both of the constraining layers and/or through the sealant layer.

9 Claims, 4 Drawing Sheets

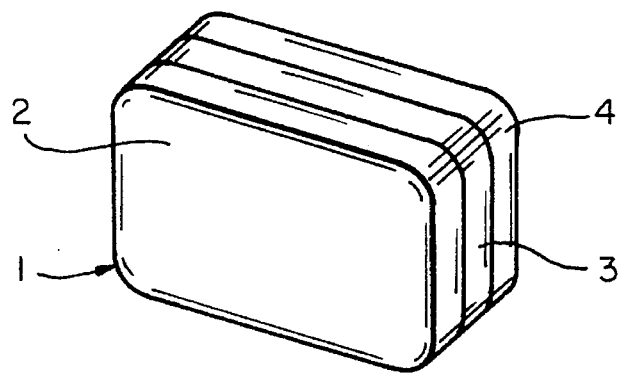
FIG_1A
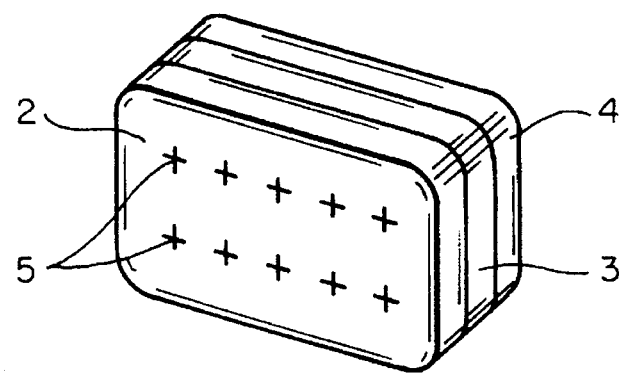
FIG_1B
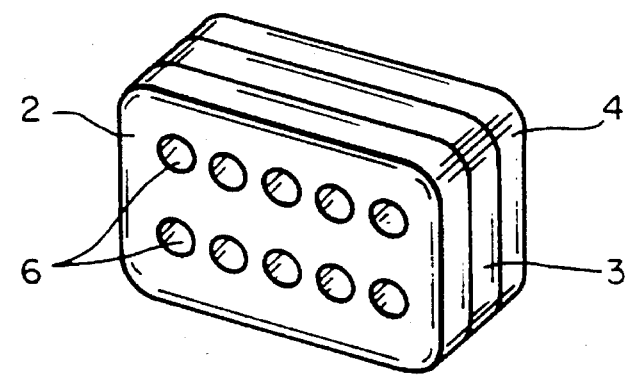
FIG_1C

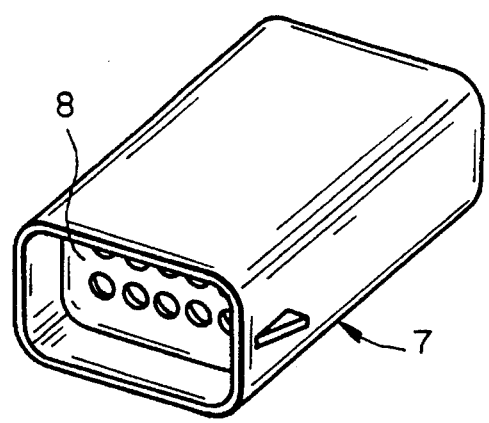
FIG_2
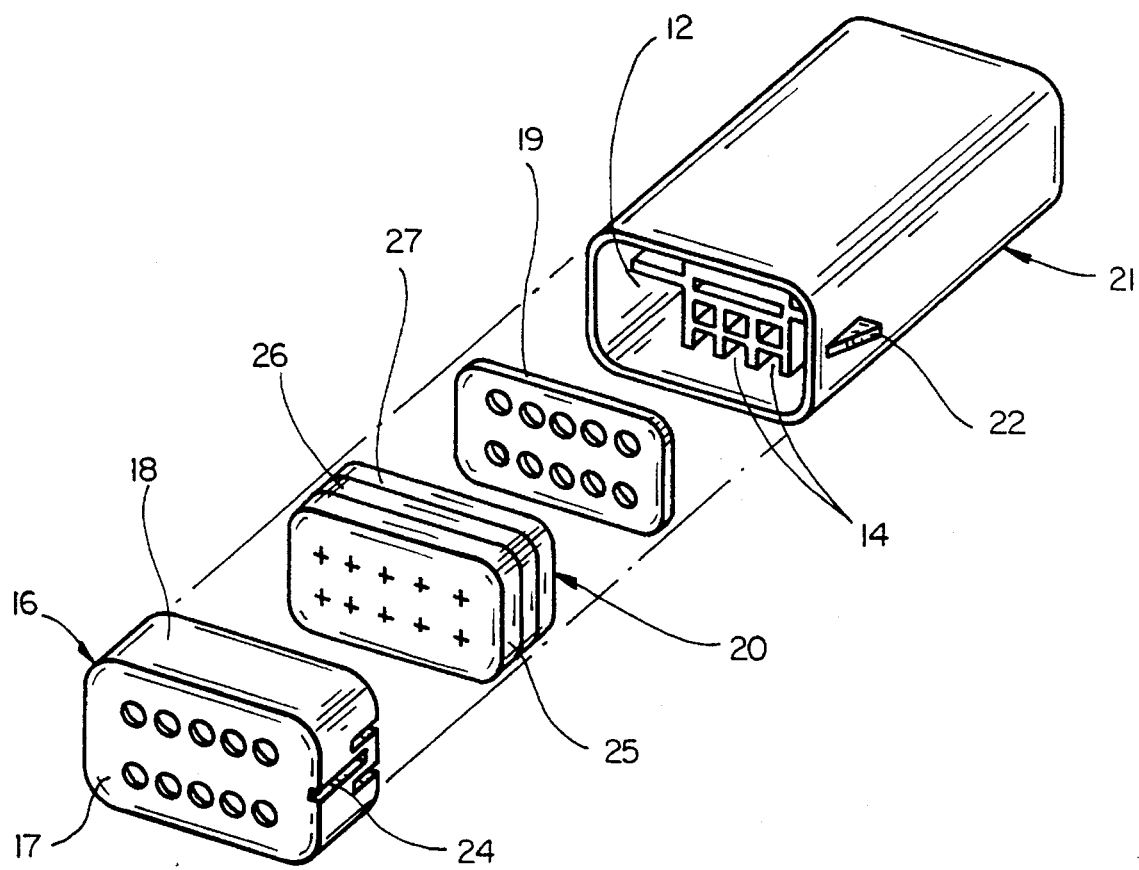
FIG_3

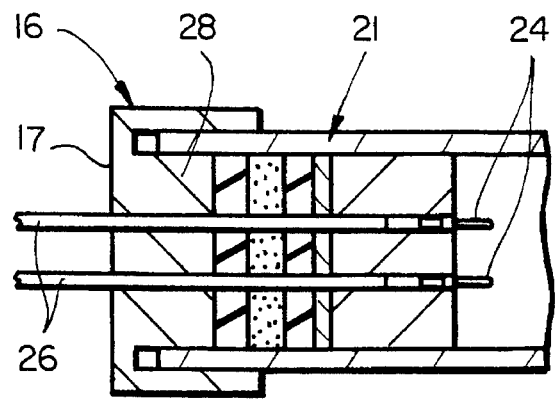
FIG_4
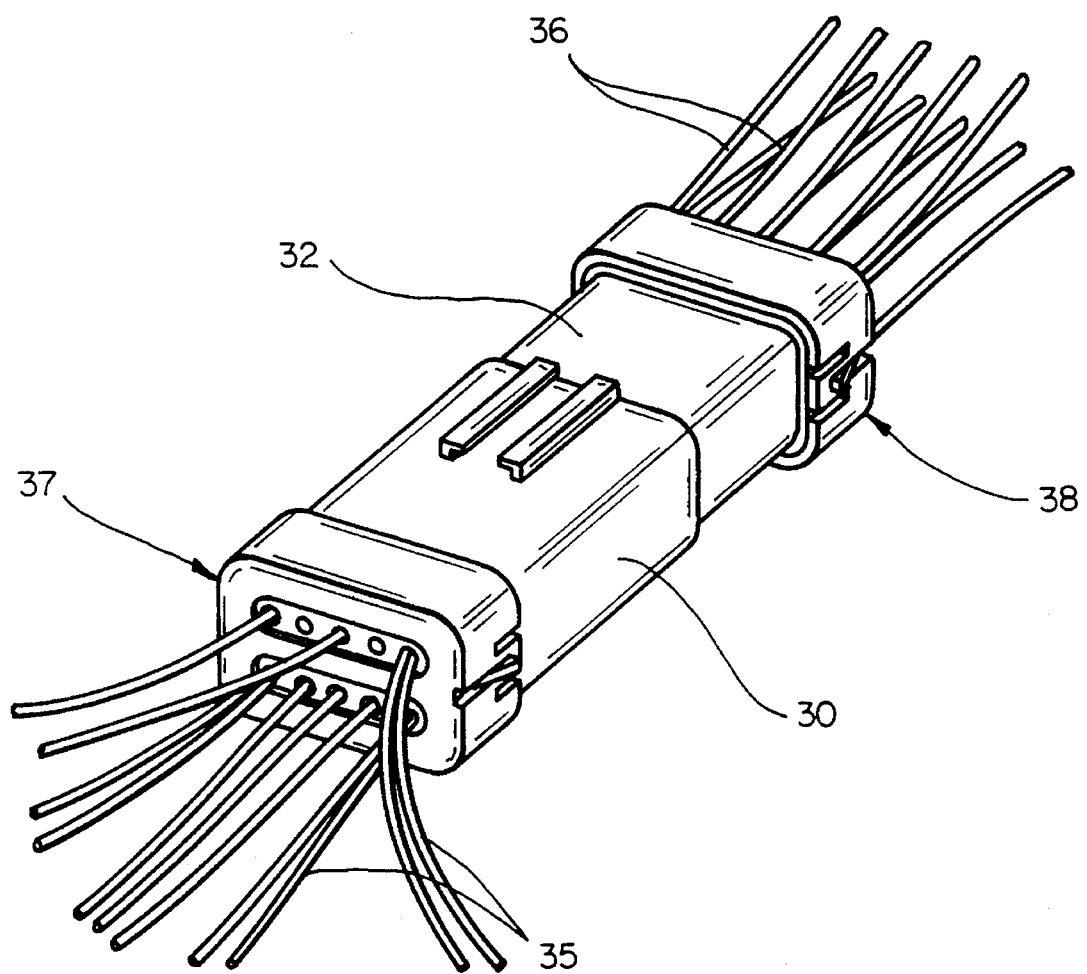
FIG_5

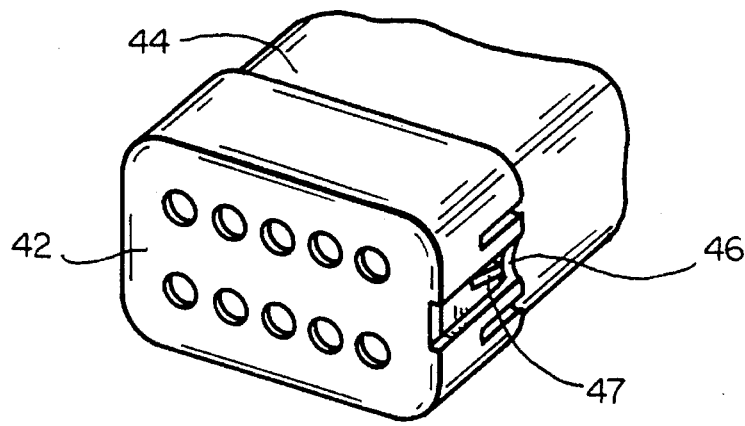
FIG_6A
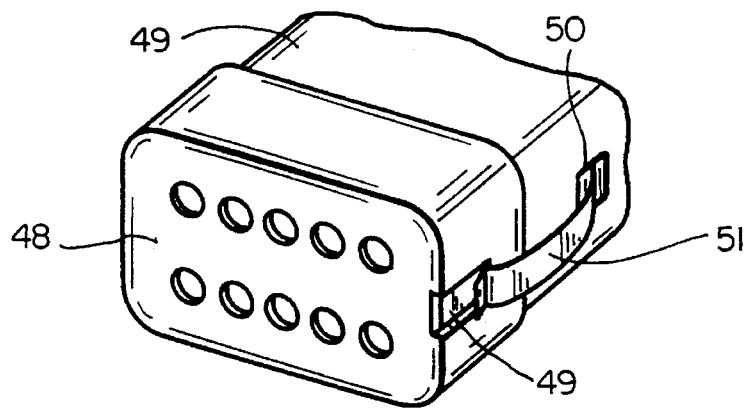
FIG_6B
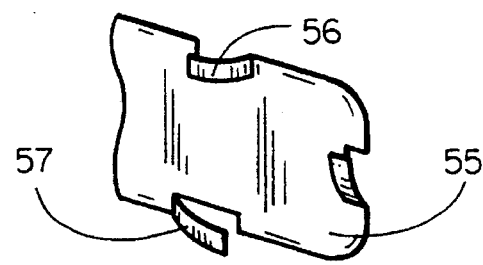
FIG_6C

SEALING MEMBER AND METHODS OF SEALING

This application is a continuation in part of application Ser. No. 07/584,320 filed Sep. 18, 1991, now abandoned, the entire disclosures of which are incorporated by reference.

BACKGROUND OF THE INVENTION

This invention relates to a sealing member, an assembly for sealing a hollow member, a method of sealing a hollow member, a method of sealing a multiconductor connector and a sealed multiconductor connector.

Known prior art methods of sealing wires and/or contact pins include the use of grommets or other similar compression seals, and the use of heat shrinkable sealing sleeves. Other prior art methods use articles containing greases. However, greases lack any type of structural network, and this results in the greases generally being viscous and flowing when subjected to temperature cycling, thereby providing a relatively unstable means for protecting the pins and/or wires. Epoxides and other adhesives have also been used, but they are also disadvantageous in that reentry is difficult.

U.S. Pat. No. 4,662,692 to Uken et al describes a method of using a layer of gel to seal contact pins. The gel is surrounded on its sides, but not on either face by a container for ease of handling and subsequent to being cured is disposed adjacent a terminal block usable for connecting the electrical contact pins with the block, and such that an opposite exposed face of the gel is not covered by the container which allows the electrical contact pins to be inserted there through so as to pierce through the gel and therefore be capable of making contact on the block side of the gel.

U.S. Pat. No. 4,875,870 to Hardy et al provides an improved article of the type disclosed by Uken et al for sealing a multiconductor connector in which the gel container is provided with special securement means to improve the compression on the gel and hence improve the seal. It also discloses an article suitable for sealing to contact pins and/or wires, which uses a layer of gel through which holes for the pins and/or wires are preformed, so that the gel is not deleteriously damaged during insertion of the pins and/or wires, the holes sealing up against the wires trailing from the contact pins when the gel is subjected to compression. In sealing wires in a multiconductor connector in accordance with the teaching of Hardy et al, the contact pins and wires are pierced through the gel and then the gel is compressed. It has been found that if the gel is compressed first and then the contact pins and wires are inserted an adequate seal is not obtained. Further, if one wants to withdraw one or more contact pins, for example for repair, and then reinsert or replace it, the compression on the gel must be released and the gel must then again be compressed to effect a seal around the replaced wire.

It has now been discovered that using a combination of one or more layers of sealant with two or more constraining layers overcomes this disadvantage of prior devices.

SUMMARY OF THE INVENTION

One aspect of this invention comprises an assembly for sealing an open end of a hollow member having an inner surface and at least one substrate extending thereinto through said open end, which assembly comprises:

a) a sealing member which comprises at least one layer of sealant positioned between two constraining layers and positioned such that said layers extend transversely across the open end of the hollow member; and b) means for applying force to the layers to maintain the sealant in sealing contact with the inner surface of the hollow member; wherein at least one of said constraining layers and/or the means for applying force to the article is sufficiently resilient to accommodate the displacement of sealant as the substrate passes through the sealant layer while maintaining sufficient force on the layers to maintain the sealant in sealing contact with the inner surface to the hollow member.

Another aspect of this invention comprises a method of sealing an open end of a hollow member having an inner surface and at least one substrate extending thereinto through said open end, which method comprises:

a) positioning across said open end of the hollow member at least one layer of sealant positioned between two constraining layers, each of said layers being positioned such that it is within the hollow member and extends transversely across said open end; and b) inserting the substrate through into the hollow member so that it passes through the sealant and constraining layers and a portion thereof extends into said hollow member; and c) installing means for applying force to the layers to maintain the sealant in sealing contact with the inner surface of the hollow member;

wherein at least one of said constraining layers and/or the means for applying force to the article is sufficiently resilient to accommodate the displacement of sealant as the substrate passes through the sealant layer while maintaining sufficient force on the sealant to maintain it in sealing contact with the inner surface to the hollow member.

A further aspect of this invention comprises a preformed sealing member for sealing an open end of a hollow member which comprises a self-supporting article having at least one layer of sealant positioned between two constraining layers, wherein each of said layers has substantially the same lateral dimensions and at least one of said constraining layers comprises a compressible foam.

BRIEF DESCRIPTION OF THE DRAWINGS

FIGS. 1A, 1B and 1C show sealing members in accordance with the invention.

FIG. 2 shows a hollow member having an integral structure or shelf which can be a constraining layer for sealing in accordance with this invention and/or as a structure which cooperates with a cap or cover (not shown) to apply force to a sealant layer positioned between them.

FIG. 3 is an exploded view of a multiconductor connector which can be protected in accordance with this invention.

FIG. 4 is a cross-sectional view of an end of the multiconductor connector protected in accordance with this invention.

FIG. 5 illustrates a multiconductor connector sealed at both ends in accordance with this invention.

FIGS. 6A, 6B and 6C show alternate means which can be used to provide the application of a force sufficiently resilient to accommodate a volume change of a sealant layer of a sealing member comprising a sealant layer and two constraining layers.

DETAILED DESCRIPTION OF THE INVENTION

In accordance with this invention the open end of a hollow member is sealed using a sealing member comprising a layer of sealant between two constraining layers. Preferably the sealing member consists essentially of one layer of sealant between two constraining layers. The sealing member can also consist essentially of a sandwich structure of several constraining layers with a sealant layer between each adjacent pair of constraining layers. In use, the sealing member is placed so that the layers are within the hollow member and extend transversely across its open end. Force is applied to the layers to maintain the sealant in sealing contact with the inner surface of the hollow member. In certain embodiments the constraining layers are of a resilient elastomeric material, preferably a compressible foam, which accommodate volume changes of the sealant. In other embodiments, the material of the constraining layers is not critical, as long as at least one of the constraining layers and/or the means applying force to the sealant is sufficiently resilient to maintain the sealant in sealing contact with the inner surface of the hollow member.

The hollow member can be, for example a plug or cap, a pipe, an electrical housing, such as a connector body, or the like. The invention is particularly useful to seal the opening of a multiconductor connector body, as described more fully below.

Each constraining layer is generally a plate or disk of approximately the same dimensions and configuration as the hollow member with which it is to be used. The constraining layers serve to constrain the sealant from flowing or being displaced from the sealant layer, for example when a substrate is inserted through the sealant layer into the hollow member. One constraining layer may be integral with the hollow member and can, if desired, be made of the same material of the hollow member. The constraining layers may be made from a relatively rigid material such as a polycarbonate, polyacrylate, metal (when an insulating material is not required), polyester, nylon, or the like. In a preferred embodiment at least one constraining layer is made from a resilient elastomeric material, such as, rubber, silicone, fluorosilicone, polyurethane, ethylene/propylene copolymer or terpolymer rubber, thermoplastic elastomers, or the like. It is particularly preferred that at least one constraining layer be of a compressible foam, for example, of an elastomeric material. The constraining layers may be the same or different. The term constraining layer is used to mean a layer of material that substantially covers the layer of sealant. Typically the layer of sealant and constraining layers have substantially the same dimensions and configuration as the open end of the hollow member.

In embodiments of the invention in which a substrate passes through the layers of the sealing member the constraining layers should be of a material through which the substrate can readily pass or should contain slits and or holes to provide entry/exit sites for the substrates. If a constraining layer is of a rigid material then holes must be provided to permit passage of the substrates. The number of holes and/or slits generally is equal to the number of substrates to be inserted into the hollow member through the sealing member.

The layer of sealant may be a sealing material such as a grease or a gel. A preferred sealant is a gel. The gel preferably has a Voland Hardness of about 1 to about 525 g., more preferably about 5 to about 300 g, and most preferably about 5 to about 100 g., and also preferably has an ultimate elongation of at least about 50%, preferably at least about 100%. The elongation is measured according to the procedures of ASTM D217. The Voland hardness is measured using a Voland-Stevens Texture analyser Model LFRA having a 1000 g load cell, a 5 gram trigger, and a ¼ inch(6.35 mm) ball probe. For measuring the hardness of a gel a 20 ml glass scintillating vial containing 10 grams of gel is placed in the Voland-Stevens Texture analyser and the stainless steel ball probe is forced into the gel at a speed of 2.0 mm a second to a penetration distance of 4.0 mm. The Voland Hardness value of the gel is the force in grams required to force the ball probe at that speed to penetrate or deform the surface of the gel the specified 4.0 mm. The Voland Hardness of a gel may be directly correlated to the ASTM D217 cone penetration hardness and the procedure and a correlation is shown in FIG. 3 of U.S. Pat. No. 4,852,646 to Dittmer et al, the disclosure of which is incorporated herein by reference.

The gel is preferably a liquid-extended polymer composition. The polymeric component can be for example, a silicone, polyorgano siloxane, polyurethane, polyurea, styrene-butadiene and/or styreneisoprene block copolymers. The gels may be formed from a mixture of such polymers. The layer of gel may comprise a foam impregnated with the gel. Examples of gels can be found in U.S. Pat. Nos. 4,600,261 to Debbaut, 4,716,183 to Gamarra et al, 4,777,063 to Dubrow et al 4,864,725 to Debbaut et al, and 4,865,905 to Debbaut et al, European published patent application No. 204,427 to Dubrow et al and International published patent applications Nos. 86/01634 to Toy et al, and WO 88/00603 to Francis et al and commonly assigned copending U.S. applications Ser. Nos. 317,703 filed Mar. 1, 1990 to Dubrow et al and 485,686filed Feb. 27, 1990 to Rinde et al. The entire disclosures of the above are incorporated by reference herein for all purposes. The gel may be impregnated in a matrix such as a foam or fabric. Gel impregnated in a matrix is disclosed in U.S. Pat. Nos. 4,690,831 to Uken et al and 4,865,905 to Debbaut et al,the entire disclosures of which are incorporated herein by reference for all purposes.

One or more of the layers of sealant may be of substantially uniform thickness. In other embodiments, the sealant may be thicker in the regions through which the substrate is to be inserted. The thickness of one layer of sealant may be different from the thickness of another. Similarly the constraining layers may be the same or different and may be of uniform thickness or of variable thickness. Slits and/or holes may be provided in the sealant to make it easier to insert a substrate, if desired. If slits or holes are provided through the sealant, each hole should be somewhat smaller than the diameter of the substrate to be inserted therethrough so that the sealant is maintained in sealing contact with the substrate.

In a preferred embodiment, the sealing member is preformed and is a self-supporting article comprising a layer of sealant between two constraining layers, one of the constraining layers being a compressible foam.

The sealing member can be prepared by placing a constraining layer on each side of a layer of sealant. In certain embodiments, one or both of the layers may be an integral part of another structure, for example, the constraining layer may be integral with the hollow member and/or it may be integral with a cover or cap to be positioned over the open end of the hollow member. In embodiments in which the sealant is a gel, the adhesive characteristics of the gel may cause the gel layer to be adhered to an adjacent constraining layer. In some embodiments, the sealing member is a self supporting article and is a laminate of sealant and one or both sealing layers. The article can be made by cold lamination of the sealant and constraining layers.

In use the sealing member is placed across the hollow member to be sealed, with the layers being positioned transversely across the member. The sealing member is preferably positioned at an open end of the hollow member. Force is applied to maintain the sealant in sealing contact with the inner surface of the hollow member. The force can be applied, for example, by placing an appropriately configured cap over the hollow member. Preferably at least one of the constraining layers and/or the means applying force to the layers is capable of accommodating a change in volume of the sealant brought about by for example, temperature excursions or passing one or more substrates through the layers. In a preferred embodiment the constraining layers are of a compressible foam which contracts and expands as the volume of the sealant becomes larger, then smaller. In another embodiment the constraining layer is provided with a spring to apply force which maintains the sealant in contact with the inner surface of the hollow member to be sealed. In still other embodiments, a cap is placed over the open end and secured to the hollow member by means of a spring clip.

In a preferred embodiment the open end of a multiconductor connecter is sealed or protected in accordance with the invention. Illustrative multiconductor connectors which can utilize the sealing member of this invention are those described in U.S. Pat. No. 4,923,405 to Munsterman et al and above mentioned U.S. Pat. No. 4,875,870 to Hardy et al, the entire disclosures of which are incorporated by reference herein for all purposes. The multiconductor connector has hole for insertion of terminals attached to trailing lead wires. The terminal may make contact with appropriate mating terminals on a printed circuit board or wires to be spliced to the trailing lead wires. The connector body is typically made of a material such as polycarbonate polyester, polyacrylate, or the like.

The open end of the connector is provided with a cover or cap comprising a base having a plurality of holes therein corresponding to the holes in the connector body and sides. The cap is made of materials similar to those used for the connector body and preferably is made from the same material as the connector body with which it is used. The base of the cap may be one of the layers constraining the sealant.

The terminals with their trailing wires are inserted through the holes in the base and into the pin receiving holes in the connector body. The sealing member is positioned in the open container parallel to the base so that the terminals and trailing wires pass through the various layers of the member. It is an important feature of this invention that a terminal and wire or wires connected thereto can be repeatedly removed and reinserted (or replaced with another terminal). Generally, the layers of the sealing member are continuous and the contacts and trailing wire pierce through the layers of the sealing member. Thus, if all holes of the connector body and cover are not filled with the number of terminals utilized in a given application, the sealing member provides a continuous structure across the holes and eliminates the need for sealing plugs or the like.

Use of the sealing member of this invention will be more readily understood with reference to the accompanying drawings in which the same reference numeral is used for the same element in each of the illustrated embodiments. FIGS. 1A, 1B and 1C show sealing members in accordance with this invention. In FIG. 1A sealing member I comprises resilient elastomeric constraining layers 2 and 4 made of a silicone foam A layer of sealant 3 is positioned between the constraining layers. The sealant comprises a polyurethane foam matrix impregnated with a silicone gel. In Fig. 1B, constraining layer 2 is provided with slits 5 to provide entry sites for a substrate to be inserted through the sealing member. In FIG. 1C, constraining layer 2 is provided with holes 6 for the same purpose.

FIG. 2 shows a hollow member 7 which can be sealed in accordance with this invention. In the illustrated embodiment, the hollow member is provided with a shelf 8 which can act as a constraining layer of a sealing member (other components not shown) or as means which can cooperate with a cap to apply a force to a sealant of a sealing member positioned between them. Shelf 8 is of a relatively rigid material and is provided with holes for passage of wires therethrough.

FIG. 3 shows an exploded view of the assembly of this invention. Connector body 21 comprises sides 12 and has a plurality of holes 14 for receiving contact pins. Cover 16 comprises base 17 and sides 18 and has a plurality of holes corresponding to the holes in the base. Plate 19, which in conjunction with the cover defines a cavity for receiving the sealing member 20, also has a plurality of holes corresponding to the holes in the connector body and cover. Sealing member 20 comprises a three layer structure of two constraining layers of silicone foam and one layer of a matrix impregnated with foam, the layers arranged as in FIG. 2. The connector body is provided with protrusion 22 which mates with slot 24 on the cover to secure the cover to the base.

FIG. 4 shows in cross- section the sealed open end of the multiconductor assembly of FIG. 3. In FIG. 4, terminals 24 with trailing lead wires 26 have been inserted through sealing member 20. Cover 16 has been positioned over the open end of the connector body 21. The base 17 of the cover 16 has a raised portion 28 to apply a force to the sealing member 1. The sealing member consists of constraining layers 25 and 27 formed of a compressible foam, which has been compressed by the application of force by the cover 16 and plate 19. The compressed foam is sufficiently resilient to accommodate the volume change in the sealant layer 26 as the terminals and wires are inserted into the connector. Further it should be noted that the terminals and wires can be repeatedly removed and reinserted with the compressed foam being sufficiently resilient to accommodate the repeated volume change.

FIG. 5 shows two connector bodies 30 and 32 secured together with clips 34 to form the desired interconnection between appropriate ones of wires 35 and wires 36. Both ends of the connector are sealed covers 37 and 38 utilizing a sealing member of this invention as described above.

FIGS. 6A, 6B and 6C show alternate ways of applying force to a sealing member in which the means for applying force is sufficiently resilient to accommodate volume changes in the layer of sealant. In FIG. 6A, Cover 42 fits over hollow member 44. Cover 42 is provided with a spring closure member, consisting of deformable beam member 46 and latch 47. In FIG. 6B, cover 48 and hollow member 49 are provideed with indentations 49 and 50, respectively. A resilient C-shaped clamp 51 fits into the indentations to secure the cover to the hollow body. This applies a force to a sealing member (not shown) within the hollow member which is sufficiently resilient to accommodate volume changes in the sealant layer as wires are inserted and removed as desired.

FIG. 6C shows a plate 55 which is provided with spring elements 56 and 57. Plate 55 can be used as a constraining layer in a sealing member for sealing a hollow member in accordance with this invention. The plate 55 can also be used as a structure such as plate 19 of FIG. 3, or inside a cover in place of, or in addition to, raised portion 28 of cover 16 shown in FIG. 4.

While this invention has been described primarily as used to seal the open end of a multiconductor connector, it is to be understood that the invention can be used to seal the open end of any hollow body.

What is claimed is:

1. An assembly for sealing an open end of a hollow member having a inner surface and at least one substrate extending thereinto through said open end, which assembly comprises:

a) a self-supporting sealing member which comprises at least one layer of sealant positioned between to discrete constraining layers and positioned such that said layers extend transversely across the open end of the hollow member; and b) means for applying force to the layers to maintain the sealant in sealing contact with the inner surface of the hollow member;

wherein at least one of said constraining layers and the means for applying force to the layers is sufficiently resiliant to accommodate the displacement of sealant as the substrate passes through the sealant layer while maintaining sufficient force on the layers to maintain the sealant incontact with the inner surface of the hollow member.

2. An assembly according to claim 1, wherein at least one of said constraining layers is resilient, and preferably comprises a compressible foam.

3. An assembly in accordance with claim 1, wherein at least one of the constraining layers is provided with at least one slit and/or hole creating a discrete entry/exit site for the substrate.

4. An assembly in accordance with claim 1, wherein the hollow member comprises a connector body which contains means for accommodating the layers of sealant and constraining layers at the open end thereof and the means of applying force to the article comprises a cap positioned onto the connector body.

5. An assembly in accordance with claim 1, wherein one of said constraining layers is integral with the hollow member.

6. An assembly in accordance with claim 1, wherein the sealant has a Voland Hardness of about 1 to about 500 g or an elongation of at least about 100% or comprises a gel.

7. A preformed sealing member for sealing an open end of a hollow member which comprises a self-supporting article having at least one layer of sealant positioned longitudinally between two constraining layers, wherein each of said layers has substantially the same lateral dimensions and at least one of said constraining layers comprises a compressible foam.

8. A sealing member according to claim 7, wherein at least one of said constraining layers is provided with a slit and/or hole creating a discrete entry/exit site for a substrate to be inserted through the sealing member.

9. A sealing member according to claim 7, wherein, the sealant has a Voland Hardness of about 1 to about 500 g, an elongation of at least about 100% or is a gel.

* * * * *